(No Model.)
E. H. PHIPPS.
JOINT FOR CEMENT LINED PIPES.
No. 383,413. Patented May 22, 1888.
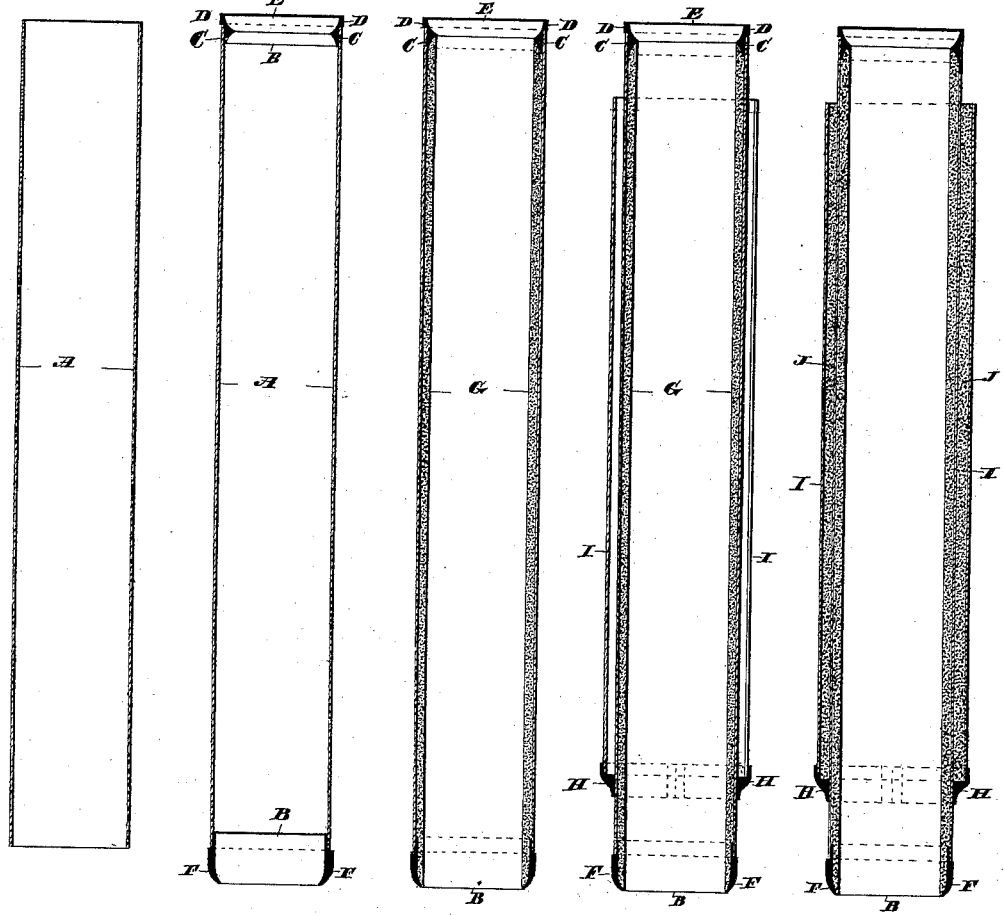
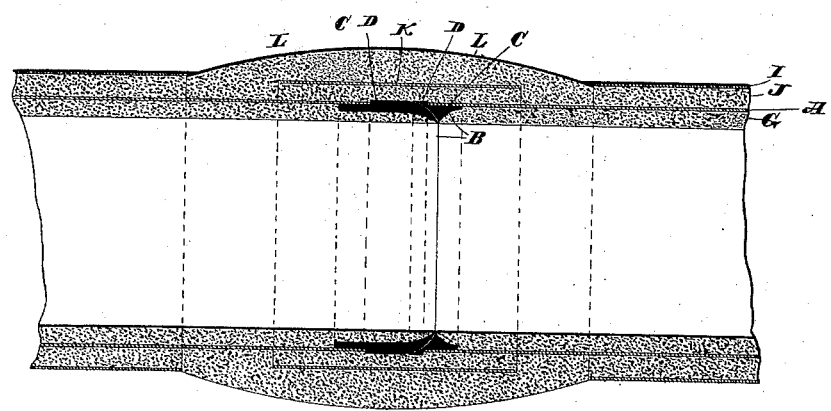
Fig. 6
WITNESSES:
Chas. B. Shumway
E. H. Rogers
INVENTOR
Edward H. Phipps
By Geo. D. Seymour
Atty

UNITED STATES PATENT OFFICE.

EDWARD H. PHIPPS, OF NEW HAVEN, CONNECTICUT.

JOINT FOR CEMENT-LINED PIPES.

SPECIFICATION forming part of Letters Patent No. 383,413, dated May 22, 1888.

Application filed June 16, 1886. Serial No. 205,386. (No model.)

*To all whom it may concern:*

Be it known that I, EDWARD H. PHIPPS, residing at New Haven, in the county of New Haven and State of Connecticut, have invented certain new and useful Improvements in Methods of Making Composite Cement Pipes; and I do declare the following to be a full, clear, and exact description of the same, reference being had to the accompanying drawings, which form a part of this specification.

Heretofore sheet-metal cement-lined pipes having metallic rings in their ends have been made in two ways: first, by folding a long length of metal into a shell, then riveting into one of its ends a sheet-metal ring having its outer end tapered, and then lining the shell and ring with cement, which is drawn to an edge at the ringless end of the pipe to form a seat for the tapering end of the ring of another pipe. Each pipe section so made is also provided at its ringless end with an exterior cast ring or band to prevent it from crushing. The method and process above described have been found objectionable—the method on account of the labor and expense of riveting the rings in place, and because, when the shells are lined, which is done by supporting them upon their ringed ends, the rings, being light, are not only crushed and distorted, but the cement lining them is displaced, so that the pipes have to be worked over and patched after they are lined; and the product because, being insufficiently supported at the ends, the pipes get out of shape, so that they cannot be laid with good joints, and because one member of each joint is made with cement drawn to a thin edge liable to injury, both in handling the pipes and not durable as a factor in the joint. The other of the two ways referred to above of making sheet-metal cement-lined pipes is radically different as a method and secures a radically-different product. It consists in winding a sheet of metal around a composition cylinder and over the sleeves of rigid rings abutted against each end of the cylinder, with the inner walls of which their inner walls are flush, having deep shoulders, and their outer ends adapted to interlock and form rigid joints. The metal is wound around the cylinder and sleeves and then upon itself with layers of asphaltum between its successive layers. The shoulders of the rings are necessarily deep, because they are relied upon to protect the ends of the several layers of metal and composition. These pipes are very expensive, do not present a continuous interior wall of cement, the cylinders being separated by a broad band of iron formed by the inner walls of the two adjacent rings, and, moreover, they are rigid in their joints when laid, the shoulders of the interlocking outer ends of the rings preventing the pipes from being relatively deflected except to break their joints.

The object of my invention is to overcome the objections above recited, and to produce sheet-metal cement-lined pipe having ringed ends which shall be cheap, durable, efficient, and flexible in its joints.

With these ends in view my invention consists in a folded sheet-metal cement-lined shell having in each end a rigid cement-lined ring, each provided with a sleeve closely fitting into the shell in direct contact therewith, a shoulder virtually corresponding in depth to the thickness of the shell which abuts against it, and an end adapted to form one member of a water-tight universal joint.

In the accompanying drawings, Figures 1, 2, 3, 4, and 5 are sectional views respectively representing the successive steps in the manufacture of my improved pipe; and Fig. 6 is a similar view showing a joint made between two sections thereof.

The shell A of the pipe is made by folding and lapping the edges of a long strip of sheet metal. The rigid rings B B are preferably formed of cast-iron and one is located in each end of the shell. Each ring is provided with a sleeve, C, adapted to fit closely into the shell in direct contact therewith, and with a shallow shoulder, D, virtually corresponding in depth to the thickness of the shell, the edge of which abuts against it. The outer end of the ring in one end of the pipe is convexed, as at E, while the corresponding end of the ring in the other end of the pipe is concaved, as at F, whereby the rings are respectively adapted to form a water-tight universal joint with another ring of opposite end conformation. It will be noted that the end of the convexed ring is unbroken by any shoulder, so that the rings may be deflected without breaking the joint formed by them. A lining, G, of cement is provided for the shell and rings. An envelope, H, of cement, surrounding the shell, is protected by a light sheet-metal jacket, I. The hinged ring H (shown by Figs. 4 and 5 of the drawings) is temporarily employed to support the jacket while the envelope H is being applied to the shell.

In making my improved pipe the shell A is first formed. A rigid ring, B, having a convexed end, is then driven into one end of the shell, and a similar ring having a concaved end is driven into the other end thereof. The shell is then under ordinary methods supported virtually upon one of its ends and provided with its lining of cement, which also lines the rings, so that when the pipe-sections are laid there will be a continuous interior wall of cement. After applying the cement lining as described the shell is clasped near its lower end with the hinged ring H and inclosed by the jacket I, which is supported upon such hinged ring. The space between the shell and jacket is then filled with cement, forming the envelope J. When this cement is dry the pipe is done.

In laying pipes made under my invention pipe ends carrying concaved and convexed rings, respectively, are inserted into the opposite ends of a short sleeve, K, which is inclosed in a crowning band, L, of cement, which is crowded into the sleeve and joins the adjacent ends of the jackets and envelopes.

By the abutment between the shoulders of the rigid rings and the ends of the shells the latter are supported without buckling or distortion when the shells are set up for being lined and enveloped with cement, or when the pipes are set up for drying or for storage.

The rigid sleeves of the rings, by closely fitting into the ends of the shells, support and preserve the shape of the same under all conditions of pressure and strain to which they may be subjected. By driving the sleeves into the ends of the shells the rings are held in place by friction and without other aid. One important function of the rings is to support the weight of the metal and cement while the shell is standing for being lined and enveloped with cement, and while being tipped for moving. Under these circumstances the under ring carries the load and prevents the shell from being distorted and the cement from being cracked and displaced, and so avoids all necessity for subsequent truing of the shell and patching of the lining. The rings also increase the structural strength of the pipes and prevent them from sagging or losing their rotundity under the weight of the cement. Moreover, they greatly facilitate the safe handling and transportation of the pipes, besides being cheap to produce and to apply. By adapting them to be cement-lined a continuous cement wall through the pipes is obtained with obvious advantage.

Having fully described my invention, what I claim as new, and desire to secure by Letters Patent, is—

A folded sheet-metal cement-lined shell having in each end a rigid cement-lined ring, each provided with a sleeve closely fitting into the shell in direct contact therewith, a shoulder virtually corresponding in depth to the thickness of the shell against which it abuts, and an end adapted to form one member of a water-tight universal joint, the two rings of each shell being concaved and convexed, respectively, substantially as set forth.

In testimony whereof I have signed this specification in the presence of two subscribing witnesses.

EDWARD H. PHIPPS.

Witnesses:
JAMES G. CLARK,
WILLIAM J. LUM.